United States Patent [19]

Cunningham

[11] 4,052,343

[45] Oct. 4, 1977

[54] CROSSLINKED, MACRORETICULAR POLY(DIMETHYLAMINOETHYL METHACRYLATE) ION-EXCHANGE RESINS AND METHOD OF PREPARATION BY AQUEOUS SUSPENSION POLYMERIZATION USING TRIALKYLAMINE PHASE EXTENDER

[75] Inventor: Virginia L. Cunningham, Hatboro, Pa.

[73] Assignee: Rohm and Haas Company, Philadelphia, Pa.

[21] Appl. No.: 630,477

[22] Filed: Nov. 10, 1975

[51] Int. Cl.$^2$ .................... C08F 20/34; C08F 2/18
[52] U.S. Cl. ..................... 260/2.1 E; 260/29.6 N; 260/29.6 HN; 260/32.6 R; 526/217; 526/312
[58] Field of Search ............ 260/32.6 R, 29.6 HN, 260/29.6 N, 2.5 R, 2.1 E; 526/217, 312

[56] References Cited

U.S. PATENT DOCUMENTS

| | | | |
|---|---|---|---|
| 3,218,302 | 11/1965 | Melamed | 260/2.1 E |
| 3,322,695 | 5/1967 | Alfrey, Jr. et al. | 260/2.1 E |
| 3,663,467 | 5/1972 | Albright | 260/2.1 E |
| 3,957,741 | 5/1976 | Rembaum et al. | 526/312 |

*Primary Examiner*—Joseph L. Schofer
*Assistant Examiner*—Peter F. Kulkosky

[57] ABSTRACT

Novel crosslinked ion exchange resins derived from dimethylaminoethyl methacrylate are disclosed together with their process of manufacture by suspension polymerization preferably utilizing a trialkylamine phase extender. Trialkylamines are found to be useful generally as phase extenders for the preparation of other polymeric materials by the known methods of suspension polymerization.

2 Claims, No Drawings

4,052,343

CROSSLINKED, MACRORETICULAR POLY(DIMETHYLAMINOETHYL METHACRYLATE) ION-EXCHANGE RESINS AND METHOD OF PREPARATION BY AQUEOUS SUSPENSION POLYMERIZATION USING TRIALKYLAMINE PHASE EXTENDER

This invention concerns novel ion exchange resins and a method of preparing the same. In particular, it concerns weak base anion exchange resins produced by crosslinking dimethylaminoethyl methacrylate preferably in the presence of a novel phase extender, a trialkylamine The invention also concerns the use of a trialkylamine in the process of manufacturing other polymeric materials known in the art by suspension polymerization.

Both macroreticular and the so-called "gel" form weak base anion exchange resins containing a polyamine functional group are well-known in the prior art. To achieve macroreticularity, or said another way, macroporosity, polymerization must be very carefully controlled in a suspension medium. This medium contains a substance which is a solvent for the monomer or monomer mixture and a non-solvent for the polymer, said solvent being referred to hereinafter alternatively as a "phase extender." Subsequent to polymerization, the phase extender which is trapped in the polymer bead must be removed, e.g., by washing the bead with another solvent or, more commonly, by azeotropic distillation of the aqueous suspension slurry. The principal factors which determine whether a particular monomer may be utilized in producing a macroreticular resin are, therefore, (1) selection of a phase extender which produces the desired degree and type of macroporosity and (2) which may be removed easily from the final resin beads. Other secondary considerations include the flammability of the phase extender and its solubility in water (the suspending medium), crosslinker level, and phase extender level.

While polyamine-functionalized resins may be produced by a variety of processes, largely depending upon the particular monomer used, the known techniques generally require multiple operations and reactions. For example, the ubiquitous styrene/divinylbenzene (DVB) weak base ion exchange resins are produced commercially by processes that involve the three steps of (1) polymerization, (2) chloromethylation and (3) amination to yield a functionalized copolymer. Although somewhat more simplified, preparation of acrylate-based resins also involves multiple steps, i.e., (1) polymerization followed normally by (2) amination. Notwithstanding the inherent expense and complexity of producing ion exchange resins by these prior art methods, multiple reaction procedures remain the standard for commercial production.

Post-functionalization of a crosslinked copolymer, such as by chloromethylation followed by amination, also has the inherent disadvantage that each potential site on the copolymer which is available for an amine group may not be filled. From an ideal standpoint, to obtain maximum resin capacity each available site should have a functional group capable of exchanging ions. Functionalization of the monomer prior to polymerization is an obvious possibility for achieving high capacity, but unfortunately, there are few prefunctionalized monomer materials commercially available which lend themselves to the suspension polymerization of ion-exchange resins.

I have now discovered that a novel ion exchange resin, poly(dimethylaminoethyl methacrylate), may be produced by a one step suspension polymerization of dimethylaminoethyl methacrylate monomer with a crosslinking monomer. In a preferred aspect I have found that an insoluble, novel crosslinked macroreticular weak-base anion exchange resin can be produced by polymerizing dimethylaminoethyl methacrylate in the presence of a novel phase extender, that is, a trialkylamine. The novel resins of my invention have both high ion exchange capacity and other adsorptive properties and are therefore useful for removal of species heretofore known to be removable by macroreticular acrylic weak base ion exchange resins.

Accordingly, the invention provides a convenient and inexpensive one-step polymerization which avoids postfunctionalization and the disadvantages thereof to yield resin having the following desirable characteristics:

1. controlled porosity
2. good resistance to organic fouling
3. excellent physical stability
4. high anion exchange capacity The key to my discovery of the novel macroreticular poly(dimethylaminoethyl methacrylate) is the finding that certain trialkylamines perform very well as phase extenders in suspension polymerization. Attempts to produce such resins with the known prior art phase extenders have been generally unsatisfactory, resulting in undesirable or no resin porosity, non-uniform porosity and difficulties with removal of phase extender after formation of the resin beads. By contrast, certain trialkylamines can be used individually or in mixtures to controllably furnish resins having a wide range of porosity.

The trialkylamines found to be suitable for preparing the novel macroreticular resins of the invention are those containing lower alkyl groups, particularly $C_2 - C_8$ alkyl groups, either the same or mixed groups. In general, the trialkylamine is one in which the three alkyl groups are either linear or branched or mixtures thereof, and the sum of the carbon atoms is between about six and about 21. Preferably, the alkyl amines are tripropylamine, tributylamine and triamylamine, and mixtures thereof. Other suitable amines include mixtures of triethylamine and trioctylamine and mixtures of tripropylamine and triamylamines.

As alluded to above, the composition of the trialkylamine has a very pronounced effect upon the porosity of the resin produced. The degree of macroreticularity induced into the resin appears to be direct function (other factors constant) of the molecular weight of the trialkylamine used, increasing as the molecular weight of the trialkylamine increases. For example, resins prepared with 8% divinyl benzene, 2% diethylene glycol divinyl ether and 40% trialkylamine will be mostly gel-like when using triethylamine, distinctly macroreticular when using tributylamine and largely overextended into a powder with trioctylamine. Thus by varying the type and amount of trialkylamine used, wide variations can be obtained in the physical properties of the resins. In addition, mixtures of different trialkylamines can be used, and this provides another means of varying physical properties. Using the preceding example with 40% trialkylamine, where triethylamine and trioctylamine produced, respectively, a gel resin and a powdered resin, a mixture containing 20% triethylamine and 20% trioctylamine as the phase extender resulted in a stable macroreticular resin.

Trialkylamines have also been found to be effective phase extenders for other monomers than those used to produce the novel resins of the invention. In particular the trialkylamines may be used with styrene, acrylics and other monomers conventionally used as well as the usual difunctional and polyfunctional crosslinkers such as divinylbenzene, trimethylolpropane trimethacrylate, and the like.

The trialkylamines can be removed from the resin by both steam-distillation or acidification, a fact particularly important for high purity applications, e.g., pharmaceutical uses, where the presence of even trace amounts of extender might be harmful.

In general, the novel resins of the invention will be a crosslinked copolymer of (1) a polyunsaturated monomer, containing a plurality of non-conjugated $CH_2=C<$ groups, which acts as a crosslinking agent and (2) dimethylaminoethyl methacrylate (DMAEMA).

Suitable polyunsaturated crosslinking agents include divinylbenzene, divinylpyridine, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, bis-phenol A dimethacrylate, pentaerythritol tetra- and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polyallyl and polyvinyl ethers of glycol, glycerol, pentaerythritol, resorcinol and the monothio or dithio derivatives of glycols.

Preferred crosslinking monomers include divinylbenzene, diethylene glycol divinyl ether, trimethylol propane trimethacrylate, and mixtures thereof. The amount of crosslinking agent or monomer can be varied widely. In general the total utilizable capacity of the final resin as an anion-exchange resin generally decreases with an increase in the amount of crosslinking agent, and an amount of about 1/2% to about 30%, and preferably about 3 to 10%, on a weight basis is usually adequate. However, for other purposes the crosslinking level can be significantly higher, i.e., up to about 50% by weight or even higher based on the total weight of the monomers.

A suitable class of free-radical generating compounds which can be used as catalysts for polymerization are the azo catalysts, including for example, azodiisobutyronitrile, azodiisobutyramide, azobis($\alpha,\alpha$-dimethylvaleronitrile), azobis($\alpha$-methyl-butyronitrile) dimethyl, diethyl, or dibutyl azobis(methyl-valerate). These and other similar azo compounds, which serve as free radical initiators, contain an —N=N— group attached to aliphatic carbon atoms, at least one of which is tertiary. An amount of 0.01% to 2% of the weight of monomer or monomers is usually sufficient.

The common peroxide catalysts known in this art, such as benzoyl peroxide, cumene hydroperoxide, acetyl peroxide, caproyl peroxide, and the like, are unsuitable generally since they tend to attack the amine group on the resin.

In making a gel resin, a wide variety of polymerization conditions and processes well known in the art can be used. However, the preferred method is suspension polymerization in a liquid, such as water, which is not a solvent for the monomeric material. This method produces the polymer directly in the form of small spheroids or beads, the size of which can be regulated and controlled. By adjustments in the composition of the suspending medium and in the rate of agitation during polymerization, the suspension polymerization process can be made to produce spheroids or beads of a wide range of effective particle sizes.

In preparing a macroreticular copolymer and resin, the polymerization reaction is carried out in the presence of a phase extender (trialkylamine) which is a liquid (a) which acts as a solvent for the monomer mixture and is chemically inert under the polymerization conditions and (b) which is present in such amount and which exerts so little solvating action on the product crosslinked copolymer that phase separation of the product copolymer takes place as evidenced by the fact that the product copolymer is no more than semi-transparent and is preferably opaque when associated with a fluid having a different refractive index.

The phase extender is present in an amount of between about 20% and 80% by weight of the total organic mixture, i.e., the mixture of monomer, crosslinker and phase extender. Preferably, the phase extender comprises 30 – 50% by weight of the organic phase and the ratio of aqueous to organic phase is about 1.5: 1. Polymerization temperatures normally are held in the range of 60° – 80° C.

Many polymerization methods can be used in preparing the macroreticular resins. The preferred method, however, is suspension polymerization. In this case, an additional factor must be considered, namely, the solubility, i.e., miscibility of the phase extender in the suspending medium. Since suspension polymerization of most ethylenically unsaturated monomers is generally conducted in aqueous media, most frequently it is the water-solubility of the phase extender which must be considered. As is well known, however, it is possible to decrease the water-solubilities of compounds by adding salts to the aqueous phase and this method also may be employed to decrease the water-solubilities of a trialkylamine. The general position is that, when suspension polymerization is used, the phase extender must be either immiscible or only partially miscible with the suspending medium.

Due to the moderately high solubility of some of the trialkylamines in water, and of dimethylaminoethyl methacrylate in water, polymerization is preferably carried out in a brine solution, e.g., an aqueous solution of 20% by weight of NaCl. The solubility of the DMAEMA in the aqueous suspension medium may also cause a pH rise therein, and could thereby affect any suspending agents or dispersants used in the aqueous phase. Accordingly, dispersants which only perform in acid medium are to be avoided. Alternatively, the aqueous medium may be buffered to maintain pH, using for example an acetate or boric acid buffer.

The following specific examples are given as illustrative of the invention, but no limitations of the broader invention as hereinbefore described are intended thereby.

EXAMPLE 1

89.0g of dimethylaminoethyl methacrylate, 19.8g of commercial divinyl benzene, containing 56.0% by weight of divinyl benzene, 2.2g of diethylene glycol divinyl ether, 1.1g of azo-bis-isobutyronitrile, and 74.0g of tributylamine were mixed together and polymerized in suspension in 352.2g $H_2O$ containing 117.4g NaCl and 10.0g magnesium silicate at 60° under nitrogen. After 12 hours, the mixture was cooled and the hard opaque resin beads washed thoroughly with water. The resin beads were then stirred with 1L of 4% HCl for ~1 hour to remove the amine phase extender. The resin was then washed repeatedly with $H_2O$ and bottled moist, giving 227.1g of wet resin of 41% solids (84% yield).

The physical properties of the resin were the following:

| % Solids | 34.3 |
|---|---|
| TAEC | 4.86 meq/g |
| SB | 0.36 meq/g |
| WB | 4.44 meq/g |
| CEC | 0.29 meq/g |
| Surface area | 23.6 m²/g |
| Porosity | 0.258 cc/cc |

TAEC = total anion exchange capacity
ST 32 strong base capacity
WB = weak base capacity
CEC = cation exchange capacity

EXAMPLE 2

199.8g DMAEMA, 22.2g trimethylolpropane trimethacrylate, 2.2g azobisisobutyronitrile and 148.0g tributylamine (TBA) were mixed and polymerized in suspension in 704.4g $H_2O$ containing 234.8g NaCl, 26.0g $MgSiO_3$, and 9.0g 4% HCl at 60° under nitrogen. After 12 hours, the mixture was heated to 107° and the tributylamine removed as its aqueous azeotrope. A total of 169 ml (89% of theoretical) of TBA was removed. The mixture was then cooled and the hard, opaque resin beads washed thoroughly with $H_2O$ and bottled moist, yielding a resin with the following physical properties.

| % Solids | = | 19.9 |
|---|---|---|
| TAEC | | 5.60 meq/g |
| SB | | 0.30 meq/g |
| WB | | 5.30 meq/g |
| CEC | | 0.32 meq/g |
| Surface area | | 6.05 m²/g |
| Porosity | | 0.018cc/cc* |

*Collapsed structure - not indicative of true porosity in water-wet state.

Using a suspension polymerization process substantially as described in Examples 1 and 2 above, a series of resins were produced with weak base ion exchange functionality. The starting materials and properties of the resins are tabulated below in Table I.

TABLE T

| Example | Phase Extender | Cross Linker | % Solids | TAEC meq/g | SB meq/g | WB meq/g | CEC meq/g | S.A. m²/g | Porosity cc/cc | Appearance |
|---|---|---|---|---|---|---|---|---|---|---|
| 3 | 40% TBA | 10% DVB 2% DEGDVE | 17.3 | 5.95 | 0.82 | 5.13 | 0.17 | 13.2 | — | Opaque |
| 4 | 40% TBA | 10% DVB 2% DEGDVE | 34.3 | 4.86 | 0.36 | 4.44 | 0.29 | 23.6 | .258 | Opaque |
| 5 | 40% TBA | 5% DVB 2% DEGDVE | 28.8 | 3.90 | 0.40 | 3.50 | 0.44 | — | — | Opaque |
| 6 | 40% TBA | 15% DVB 2% DEGDVE | 36.0 | 3.30 | 0.50 | 2.80 | 0.64 | — | — | Opaque |
| 7 | 40% TBA | 8% DVB 2% DEGDVE | — | — | — | — | 1' | — | — | Opaque |
| 8 | 40% TEA | 8% DVB 2% DEGDVE | — | — | — | — | — | — | — | Gel |
| 9 | 40% TOA | 8% DVB 2% DEGDVE | — | — | — | — | — | — | — | Opaque Powder |
| 10 | 20% TEA 20% TOA | 8% DVB 2% DEGDVE | — | — | — | — | — | — | — | Opaque |
| 40% | TBA | 10% X-980 | 19.9 | 5.60 | 0.30 | 5.30 | 0.32 | 6.05 | 0.02* | Opaque |
| 12 | 40% TBA | 10% DVB | 31.8 | 4.80 | 0.22 | 4.58 | 0.36 | 76.7 | 0.468 | Opaque |

Abbreviations used in Table I
TBA - tributylamine
TEA - triethylamine
TOA - trioctylamine
DVB - divinyl benzene
CEC - cation exchange capacity
DEGDVE - diethylene glycol divinyl ether
X-980 - trimethylol propane trimethacrylate
TAEC - total anion exchange capacity
WB - weak base capacity
SA - surface area
SB - strong base capacity
*See footnote to Example 2

Poly(dimethylaminoethyl methacrylate) resins can also be quaternized to give resins comprising units having the chemical formula:

$$\begin{array}{c} CH_3 \\ | \\ {+CH_2-C+} \\ | \\ C=O \\ | \\ O \quad\quad R \\ | \quad\quad | \\ CH_2CH_2-N^{\oplus} \ X^{\ominus} \\ | \\ (CH_3)_2 \end{array}$$

where R is selected from the group which comprises substituted or unsubstituted (a) alkyl, (b) aralkyl, (c) aryl, and (d) alkaryl functional groups which contain 1–22 carbon atoms, is linear or branched, is saturated or unsaturated or a combination of the two, and if substituted, contains 1–3 alkoxy, acyl, acyloxy, or hydroxy groups, and where X is an anion selected from the group which comprises hydroxide, halide, alkyl sulfate, bisulfate, and alkyl and aryl sulfonate anions.

The quaternization reaction of the poly(dmethylaminoethyl methacrylate) resin with RX is performed in a polar organic swelling solvent, for example, in methyl ethyl ketone, or in water, with added alkali metal catalyst, for example, potassium iodide, in "catalytic amounts" (0.05–0.50g) and with agitation. The reaction temperature for the quaternization reaction may range from −80° C to 150° C and the reaction may be carried out for a period of between 1 to 60 hours. The preferred conditions employed in the quaternization reaction depend on the reactivity of the selected RX compound with the poly(dimethylaminoethyl methacrylate) resin.

I claim:

1. A process for preparing a cross-linked macroreticular ion-exchange polymer of dimethylaminoethyl methacrylate which process comprises copolymerizing dimethylaminoethyl methacrylate by suspension polymerization in an aqueous medium with from about 0.5% to about 30% by weight of the total polymer mixture of a polyfunctional crosslinking monomer in the presence of between about 20% and 80% by weight of a trialkylamine phase extender, based on the total weight of the organic mixture, said trialkylamine having alkyl substituents of 2 to 8 carbon atoms.

2. The process set forth in claim 1 wherein the trialkylamine phase extender is selected from those containing individual alkyl groups of two to eight carbon atoms with the sum of the number of carbon atoms in the three alkyl groups between six and 21.

* * * * *